United States Patent
Chen et al.

(10) Patent No.: US 10,617,938 B2
(45) Date of Patent: Apr. 14, 2020

(54) CONVERTING TEXT-BASED GOALS TO GAMIFICATION SYSTEM

(71) Applicant: International Business Machines Corporation, Armonk, NY (US)

(72) Inventors: Li-Ju Chen, Taipei (TW); Po-Cheng Chiu, Taipei (TW); Raymund June-Ray Lin, Taipei (TW); Ying-Chen Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 15/226,741

(22) Filed: Aug. 2, 2016

(65) Prior Publication Data

US 2018/0036629 A1 Feb. 8, 2018

(51) Int. Cl.
| | | |
|---|---|---|
| *A63F 3/04* | (2006.01) | |
| *A63F 13/60* | (2014.01) | |
| *A63F 13/65* | (2014.01) | |
| *A63F 13/79* | (2014.01) | |

(52) U.S. Cl.
CPC .......... *A63F 3/0421* (2013.01); *A63F 3/0423* (2013.01); *A63F 13/60* (2014.09); *A63F 13/65* (2014.09); *A63F 13/79* (2014.09); *A63F 2300/558* (2013.01)

(58) Field of Classification Search
None
See application file for complete search history.

(56) References Cited

U.S. PATENT DOCUMENTS

| | | |
|---|---|---|
| 8,768,751 B2 | 7/2014 | Jakowski et al. |
| 2013/0291065 A1 | 10/2013 | Jakowski et al. |
| 2014/0051506 A1 | 2/2014 | Ameling et al. |
| 2014/0058801 A1 | 2/2014 | Deodhar et al. |
| 2014/0162220 A1 | 6/2014 | Rao et al. |

(Continued)

FOREIGN PATENT DOCUMENTS

| | | |
|---|---|---|
| WO | 2014/121339 A1 | 8/2014 |
| WO | 2015/127333 A1 | 8/2015 |

OTHER PUBLICATIONS

Gamification Service on Bluemix: Why Bluemix Gamification?; Aug. 17, 2014, https://www.ibm.com/developerworks/community/blogs/6d12aec9-aeea. Retrieved Apr. 20, 2016.

(Continued)

*Primary Examiner* — Robert T Clarke, Jr.
(74) *Attorney, Agent, or Firm* — Patterson + Sheridan, LLP (57) ABSTRACT

Systems, methods, and computer program products to perform an operation comprising receiving a text object comprising a plurality of text statements, inputting the text object into a text analyzer executing on a processor, the text analyzer configured to analyze the plurality of text statements in the text object based at least in part on a structure of the plurality of statements in the text object, classifying a first statement of the plurality of statements as including at least one of a performance index and an action, defining, based on the analyzing and classifying, a mission comprising the first statement as the at least one of the performance index and the action, and deploying, in a gamification system, the mission and a plurality of backend computing resources for the mission.

12 Claims, 8 Drawing Sheets

(56) References Cited

U.S. PATENT DOCUMENTS

| | | |
|---|---|---|
| 2014/0195272 A1 | 7/2014 | Sadiq et al. |
| 2014/0274413 A1 | 9/2014 | Chelst |
| 2015/0231502 A1* | 8/2015 | Allen .................. A63F 13/47 463/42 |
| 2016/0086121 A1 | 3/2016 | Heilbrunn et al. |
| 2017/0296919 A1 | 10/2017 | Margiotta |

OTHER PUBLICATIONS http://www.alchemyapi.com/api.
Kumar, Janaki: "Five Steps to Enterprise Gamification", UX Magazine, Article No. 1065, Aug. 1, 2013.

* cited by examiner

Spend at least 40 hours to enhance competencies to fulfill all assignments, especially focus on domain knowledge for cloud computing; mobility technology, technical skills, and leadership.

301

Click here to learn more about keywords.

| Entities | leadership | assignments | technical skills | cloud computing | mobility technology |
|---|---|---|---|---|---|
| Keywords | 303 | 304 | 305 | 306 | 307 |
| Taxonomy | | | | | |
| Concepts | | | | | |
| Document Sentiment | | | | | |
| Targeted Sentiment | | | | | |
| Relations | competencies | | domain knowledge | | |
| Language | 308 | | 309 | | |
| Title | | | | | |
| Author | | | | | |
| Text | | | | | |
| Feeds | | | | | |
| Microformats | | | | | |

| Keyword ~ 311 | Relevance ~ 312 | Sentiment ~ 313 |
|---|---|---|
| mobility technology | 0.958423 | positive |
| cloud computing | 0.941941 | positive |
| domain knowledge | 0.840109 | positive |
| technical skills | 0.820971 | positive |
| competencies | 0.577516 | neutral |
| assignments | 0.522535 | neutral |
| leadership | 0.392449 | neutral |

Collaborate with Technology Partner to build a system.  ~ 351

Click here to learn more about relations.

| | |
|---|---|
| | Visual  JSON  API |
| Entities | ⊕ with Technology Partner Collaborate to build a system |
| Keywords | Extracted Sentence |
| Taxonomy | Collaborate with Technology Partner to build system. |
| Concepts | Parts of Speech ~ 353 |
| Document Sentiment | |
| Targeted Sentiment | |
| Relations | |
| Language | |
| Title | |
| Author | |
| Text | |
| Feeds | |
| Microformats | |

| Text ~ 354 | Speech Part ~ 355 | Sentiment ~ 356 | Keywords ~ 357 |
|---|---|---|---|
| with Technology Partner | subject | | Technology Partner |
| Collaborate | action | | |
| to build a system | object | positive (relational) | |

| Verb Normalization ~ 358 | | | | |
|---|---|---|---|---|
| Text ~ 359 | Lemmatized ~ 360 | Verb ~ 361 | Tense ~ 362 | Negated ~ 363 |
| Collaborate | Collaborate | Collaborate | present | No |

| Relational Entities ~ 364 | | | | |
|---|---|---|---|---|
| Entity ~ 365 | Speech Part ~ 366 | Type ~ 367 | Subtypes ~ 368 | Linked Data ~ 369 |
| Technical Partner | subject | job title | | |

… Only the relevant part;

CONVERTING TEXT-BASED GOALS TO GAMIFICATION SYSTEM

BACKGROUND

The present invention relates to computer software, and more specifically, to computer software which converts text-based goals into a gamification system.

Gamification refers to the use of game design and game mechanics to engage a target audience. Gamification techniques may be used in games themselves, or non-game contexts, for any number of purposes. For example, a gamification system may be used to increase user engagement, change user behaviors, teach users new skills, or increase user productivity (e.g., in a workplace environment). Often, gamification offers rewards to users in exchange for participation in an offered service and/or game. In exchange, entities offering the gamification systems realize increased use of their services and/or games, which may lead to increased insight into the motivations and use of these products by users.

SUMMARY

In one embodiment, a method comprises receiving a text object comprising a plurality of text statements, inputting the text object into a text analyzer executing on a processor, the text analyzer configured to analyze the plurality of text statements in the text object based at least in part on a structure of the plurality of statements of the text object, classifying a first statement of the plurality of statements as including at least one of a performance index and an action, defining, based on the analyzing and classifying, a mission comprising the first statement as the at least one of the performance index and the action, and deploying, in a gamification system, the mission and a plurality of backend resources for the mission.

In another embodiment, a gamification system comprises a processor and a memory storing instructions, which when executed by the processor, performs an operation comprising receiving a text object comprising a plurality of text statements, inputting the text object into a text analyzer executing on the processor, the text analyzer configured to analyze the plurality of text statements in the text object based at least in part on a structure of the plurality of statements of the text object, classifying a first statement of the plurality of statements as including at least one of a performance index and an action, defining, based on the analyzing and classifying, a mission comprising the first statement as the at least one of the performance index and the action, and deploying, in the gamification system, the mission and a plurality of backend resources for the mission.

In another embodiment, a computer-readable storage medium has computer-readable program code embodied therewith, the computer-readable program code executable by a processor to perform an operation comprising receiving a text object comprising a plurality of text statements, inputting the text object into a text analyzer executing on the processor, the text analyzer configured to analyze the plurality of text statements in the text object based at least in part on a structure of the plurality of statements of the text object, classifying a first statement of the plurality of statements as including at least one of a performance index and an action, defining, based on the analyzing and classifying, a mission comprising the first statement as the at least one of the performance index and the action, and deploying, in a gamification system, the mission and a plurality of backend resources for the mission.

BRIEF DESCRIPTION OF THE SEVERAL VIEWS OF THE DRAWINGS

FIGS. 3A-3B illustrate user interfaces depicting the results of analyzing text for conversion to a gamification system, according to various embodiments.

DETAILED DESCRIPTION

Embodiments disclosed herein dynamically generate gamification systems based on text-based goals. For example, a manager may email an employee a list of goals as part of the employee's performance review. Embodiments disclosed herein may analyze the text of the email to add the goals to a gamification system that tracks the employee's progress towards completing the goals, provides leaderboards and views of the employee's progress, and generally engages the employee in achieving their goals. By analyzing the text-based goals, embodiments disclosed herein may convert goal statements into game mechanic "missions," convert numerical goals into performance indexes, convert non-numerical goals into actions that need to be completed, and define rules for completing the missions (which may include fulfillment of performance indexes and actions).

Figure 1:
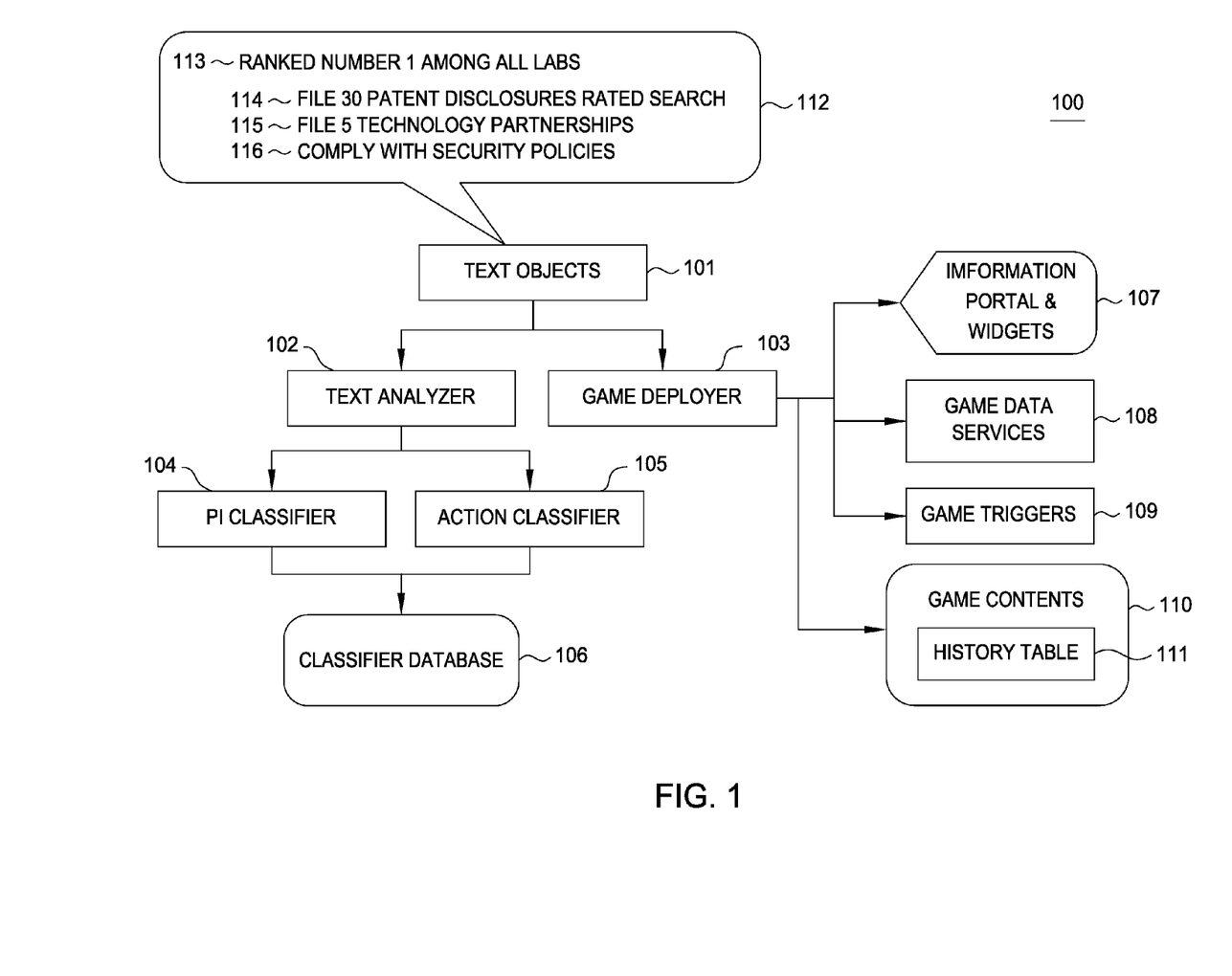
FIG. 1 illustrates an example system architecture which converts text-based goals for use in a gamification system, according to one embodiment.

FIG. 1 illustrates an example system architecture 100 which converts text-based goals for use in a gamification system, according to one embodiment. As shown, the system 100 includes one or more text objects 101, a text analyzer 102, a game deployer 103, a performance index classifier, an action classifier 105, a classifier database 106, an information portal 107, game data services 108, game triggers 109, and a game contents 110. The text objects 101 are representative of any type of data object which includes structured, textual goal statements. For example the text objects 101 may include emails, text files, database entries, word processor files, and the like. The text in the text objects may be structured according to any formatting, such as indentation, bullet points, tabs, and the like.

The text analyzer 102 is configured to analyze the text of the text objects 101, including the example text object 110, to identify parameters that can be used in the system 100. The text analyzer 102 may include any type of algorithms used in natural language processing (NLP), such as Logical Form Answer Candidate Scorer (LFACS), English slot grammar (ESG), and the like. More generally, the text analyzer 102 uses NLP to identify nouns, verbs, adjectives, etc., in the text of the text objects 101, to define missions, actions, and PIs for the gamification system. In at least one embodiment, the text analyzer 102 is a component of IBM's Watson®.

As shown, the text objects 101 include an example text object 111, which includes four statements 112-115. The text analyzer 102 may ingest the text statements 112-115 and analyze each statement for use in the gamification system 100. One part of the analysis conducted by the text analyzer 102 includes identifying the formatting and structure of the text object 111 and its constituent text statements 112-115. For example, as shown, the statement 112 is formatted such that it is left justified relative to the statements 113-115, which are tabbed to the right of the statement 112. The text analyzer 102 may identify these differences in formatting to determine that the statement 112 is a "mission" statement, and the statements 113-115 as goals used to measure fulfillment of the mission statement. As used herein, a mission statement is a high-level goal statement that includes at least one performance index or action. A performance index (PI), as used herein, is a goal statement that includes a numerical value which must be fulfilled. For example, a PI may specify that a user must file 10 invention disclosures, where 10 is the numerical value that must be fulfilled. Furthermore, as used herein, an "action" refers to a deed or other task that must be completed, but may not include an associated numerical value. For example, an action may require a user to comply with the ethics rules of a professional licensing body.

As shown, the mission statement 112 is text stating a goal to be "ranked number 1 among all labs." The text analyzer 102 may identify the mission statement 112 and determine that the goal statements 113-115 are components of the mission statement 112. For example, as shown, goal statement 113 specifies that the user must attempt to "file 30 patent disclosures rated search," where a search rating indicates the subject matter of the disclosure will be subject to a patentability investigation including a prior art search. The text analyzer 102 may invoke the PI classifier 104 to further extract information from the goal statement 113. Similarly, the text analyzer 102 may analyze the goal statement 115, and determine that in order to complete the mission statement 112, the user must "comply with security policies." The text analyzer 102 may determine, based at least in part on the absence of numerical values, the goal statement 115 is an action statement. The text analyzer 102 may then invoke the action classifier to further extract information from the goal statement 115.

The PI classifier 104 and the action classifier 105 are representative of natural language classifiers. Generally, a natural language classifier takes text as input to a pre-trained machine learning model, and outputs the input text into one of a plurality of different classes. In at least one embodiment, the PI classifier and the action classifier 105 are components of the text analyzer 102. The PI classifier 104 is configured to operate on text that includes numerical values (whether in numeric or prose form). For example, the PI classifier 104 may process the goal statement 113, and classify the statement as requiring a user of the gamification system to submit 30 patent disclosures rated search. The PI classifier 104 therefore identifies numerical values (e.g., 30, or "thirty") in text and identifies the objects (e.g., patent disclosures) that are associated with the numerical values. Similarly, the action classifier 105 is configured to operate on non-numerical goals, and identify actions that need to be fulfilled by a user of the gamification system. Therefore, for example, the action classifier 105 may identify the action required in statement 115, namely "comply with corporate security policies."

In at least one embodiment, the PI classifier 104 and the action classifier 105 may leverage information in the classifier database 106 to classify text into one of a plurality of classes (e.g., specific types of PIs and/or actions). Generally, the classifier database 106 includes training data, data models, and other objects that are used by the classifiers 104, 105 to classify text. The training data, data models, and other objects stored in the classifier database 106 may be specific to any number and types of domains (e.g., technology, medicine, commodities, and the like).

Once the text object 111 has been analyzed by the text analyzer 102 and classifiers 104, 105, the game deployer 103 may configure a plurality of backend resources for the gamification system that incorporates the goals of the text object 111. As shown, the game deployer 103 may generate an information portal and widgets 107, game data services 108, game triggers 109, and game contents 110. The game contents 110 is a database storing information related to missions, PIs, and actions. The data stored in the game contents 110 may be automatically generated by the game deployer 103 based on the outputs of the text analyzer 102 and classifiers 104, 105. Therefore, for example, the game contents 110 may include, for each of a plurality of users, an indication of the mission statement 112, which is associated with a PI of filing 30 patent disclosures rated search, a PI of achieving 5 technology partnerships, and an action of complying with corporate security policies. As the user completes PIs, actions, and missions, the game contents 110 may be updated accordingly. As shown, the game contents 110 includes a history table 112 which tracks the respective progress of each of a plurality of users. For example, when a user updates their profile to indicate the first of 5 required technology partnerships have been made, the history table 112 may be updated to reflect the user's progress. Similarly, if the user updates their profile to remove the added technology partnership, the history table 112 is updated to include a record reflecting that the technology partnership has been removed. At this point, the user may have zero technology partnerships to their credit in the game contents 110 (e.g., the PI value is zero in the game contents 110), however, the history table 112 will have two entries reflecting the addition of the technology partnership and subsequent removal of the technology partnership.

The information portal and widgets 107 include graphical user interfaces (GUIs) for the gamification system, such as web pages that allow the user to view a personal profile, track their progress towards fulfilling goals, missions, and actions, update their progress (in some cases), and the like. The widgets are objects that can interface with the gamification system from external websites (or the information portal itself) and provide information related to the gamification system via the widget. For example, a login widget may allow users to log in to their account in the gamification system and view their profile page on the information portal. Once logged in, widgets may allow users to view their progress relative to missions, PIs, and actions, and update their progress on missions, PIs, and actions (e.g., update records in the game contents 110). The widgets may further allow users to have an aggregated view of their mission status, a view of overall updates to the gamification system, and a view of a leaderboard depicting progress of a plurality of users in the gamification system based on the data tracking the users' progress in the game contents 110.

The game data services 108 are representative of a plurality of services used by the gamification system. The game data services 108 include a service to authenticate users and maintain sessions, services to update and retrieve PIs, actions, and missions from the game contents 110, a service to retrieve aggregate mission statuses from the game contents 110, a service to retrieve an indication of updates to the game contents 110, and a service to view leaderboards for the gamification system based on the progress data stored in the game contents 110.

The game triggers 109 include database triggers (i.e., a stored procedure that automatically executes when an event occurs in the database server) for the missions, PIs, and actions automatically deployed to the game contents 110 by the game deployer 103. Example game triggers 109 include database triggers responsive to events in the game contents 110. For example, when a user updates their profile to reflect that they have filed a new patent disclosure rated search (or a patent tracking system adds an indication of the new patent disclosure rated search), a trigger 109 may increase the value of the PI for the user in the game contents 110 and update a history table 112 to reflect the update. Similarly, if the user updates their profile to remove a patent disclosure previously rated search, a trigger 109 may decrement the value of patent disclosures filed search that are associated with the user in the game contents 110, and update the history table 112 to reflect the update. As another example, the game triggers 109 may include database triggers to reflect that an action has been completed in the game contents 110 and update the history table 112. Similarly, the game triggers 109 may include database triggers to reflect that an action has not been completed (e.g., when the action is automatically deployed to the game contents 110, and has not been fulfilled by the user), and update the history table 112 to reflect the change.

The game triggers 109 may also include mission-related triggers. For example, a database trigger may unlock a mission that has been deployed to the game contents 110 by the game deployer 103, and update the history table 112 to reflect that the mission has been unlocked. Similarly, when a mission is completed, a trigger 109 may update the game contents 110 to reflect that the mission has been completed, and update the history table 112 accordingly. In some embodiments, missions may be dependent on other missions. However, some dependent missions cannot be unlocked until their parent missions are completed. Therefore, if a mission is completed, a game trigger 109 may determine whether the mission has any dependent missions, unlock these missions in the game contents 110, and update the history table 112 accordingly.

Figure 2:
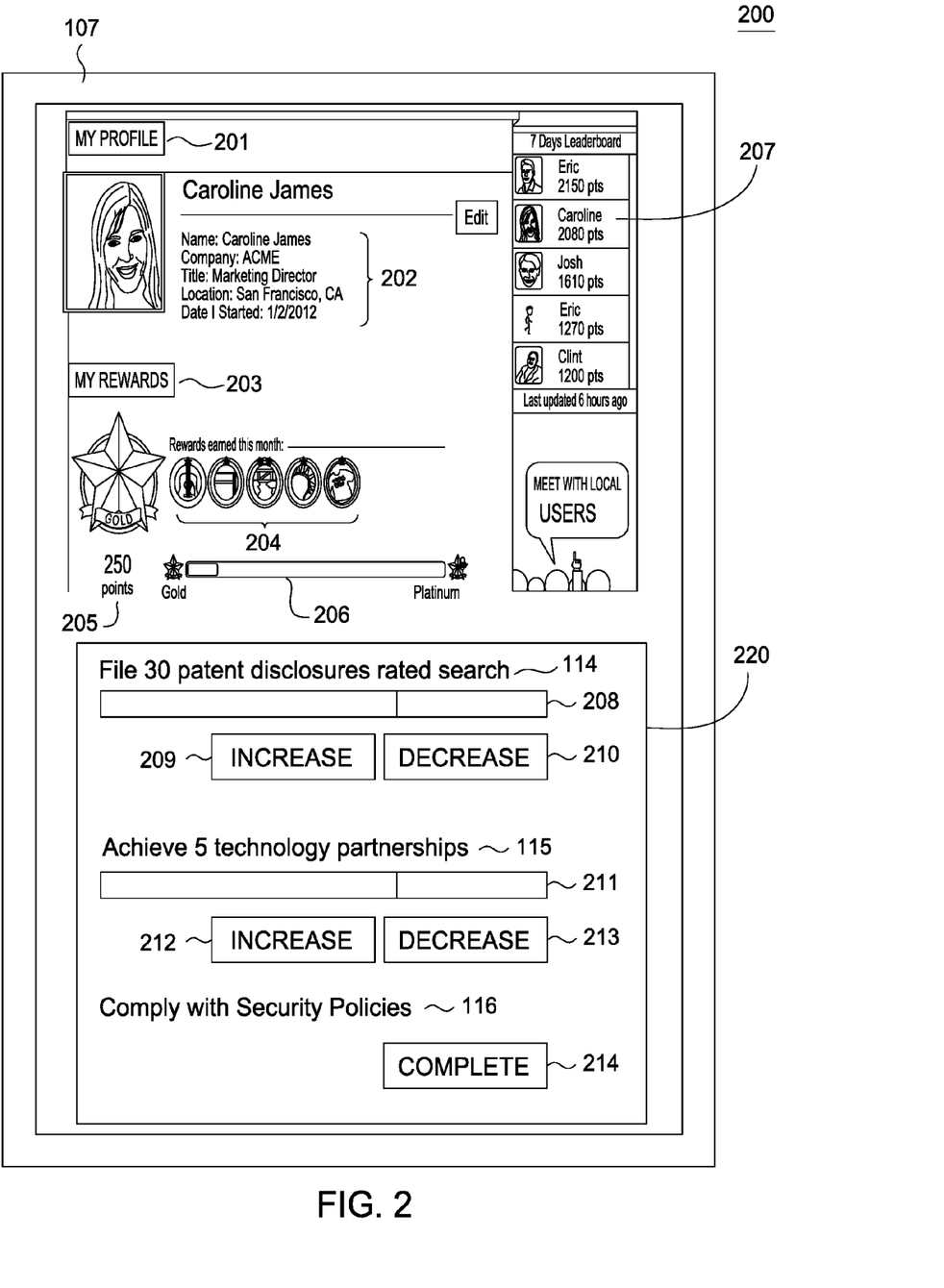
FIG. 2 illustrates an example information portal provided by a gamification system, according to one embodiment.

FIG. 2 illustrates an example information portal 107 that is part of a gamification system, according to one embodiment. As shown, the information portal 107 is a graphical user interface (GUI) that is customized for an example user. Generally, the information portal 107 may be generated using user-specific data stored in the game contents 110. The information portal 107 includes a user profile 201 that includes a plurality of attributes 202 of the user, including the user's name, company, title, location, and date the user first engaged in the gamification system.

The information portal 107 further includes a rewards section 203 that engages the user while displaying the user's progress towards their goals. For example, as shown, the rewards section includes a plurality of badges 204 that are associated with the user as the user completes PIs, actions, and/or missions. Similarly, a status indicator 205 reflects that the user is a "gold" member and has earned 250 points in the gamification system. A progress bar 206 reflects the user's progress towards the platinum level.

The information portal 107 also includes a leaderboard 107 that reflects the highest-scoring users in the previous seven days. The points reflected in the leaderboard may be based on point values assigned to PIs, actions, and missions in the game contents 110. As the user completes PIs, actions, and missions, their point total may be updated by the game triggers 109, and the information portal 107 may update the leaderboard 107 accordingly. Generally, any number and type of leaderboards may be provided by the information portal 107.

As shown, the information portal 107 includes an interface 220 that displays user progress towards PI, mission, and action completion. For example, as shown, the interface 220 depicts the user's progression relative to the text statement 113 requiring the user to file 30 patent disclosures rated search (a PI), the text statement 114 requiring the user to achieve five technology partnerships (a PI), and the text statement 115 requiring the user to comply with security. As shown, the interface 220 includes input buttons 209-210 associated with the statement 113 requiring filing of 30 patent disclosures rated search. However, these input buttons 209-210 are disabled, as the users may not be allowed to manually update certain progress. Instead, the progress may be automatically tracked. For example, the game contents 110 may be updated to reflect data in a patent tracking database that automatically associates filed disclosures with users, and tracks the progress of the disclosure (e.g., publish, file, patent granted, etc.). However, as shown, the user interface buttons 212-214 can be selected by the user. For example, if the user adds a new technology partnership, the user may select the increase button 212, which would fire a trigger 109 to update the game contents 110 to reflect the new partnership for the user (including the history table.

Figure 3A:
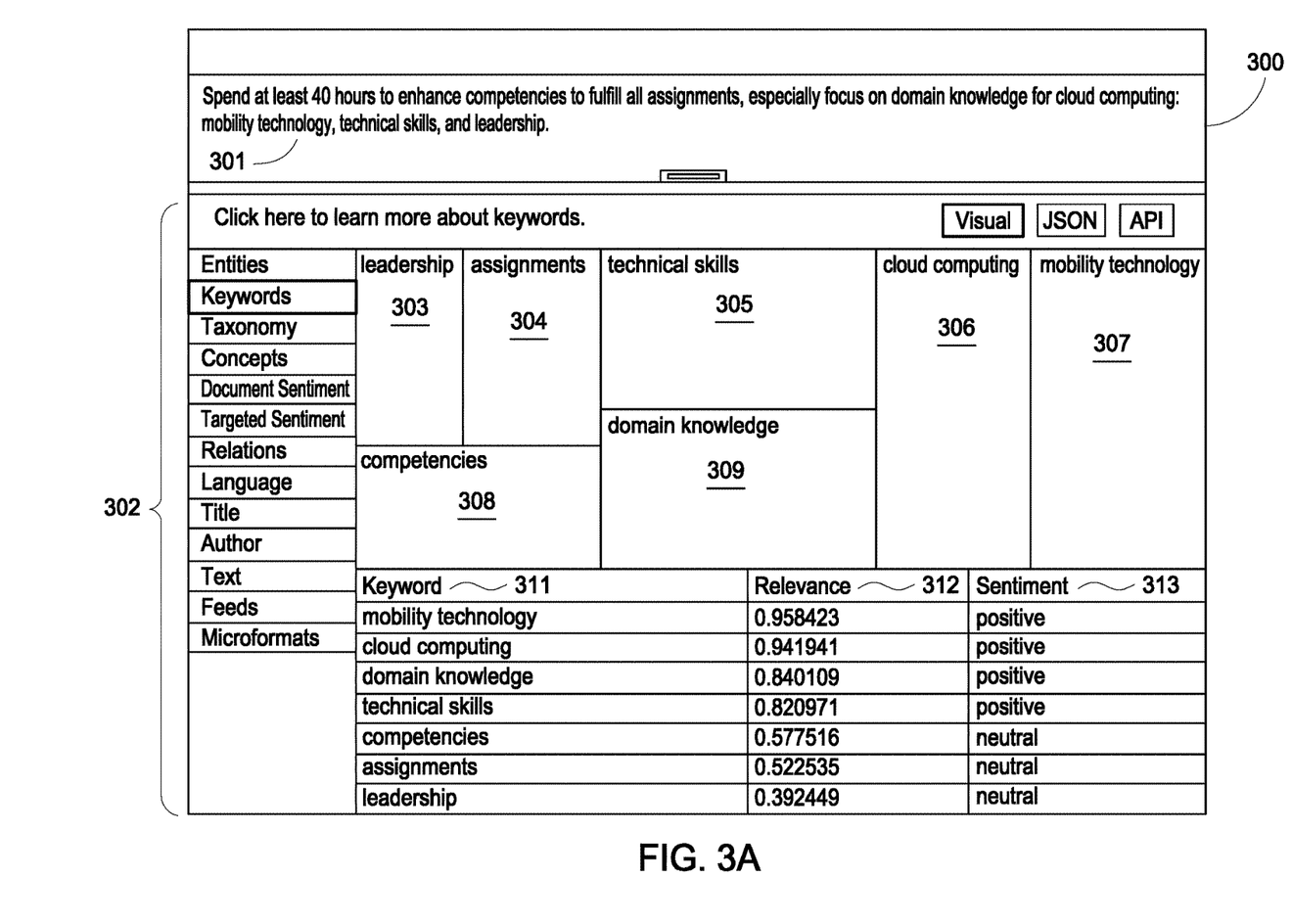

FIG. 3A illustrates a GUI 300 depicting results of analyzing text for conversion to a gamification system, according to one embodiment. In at least one embodiment, the GUI 300 is generated based on the analysis of the text analyzer 102. As shown, the GUI 300 includes an example goal statement 301 requiring a user to "spend at least 40 hours to enhance competencies to fulfill all assignments, especially focus on domain knowledge for cloud computing; mobility technology, technical skills, and leadership." The GUI 300 includes a results section 302 providing insight into the goal statement 301. As shown, the results section 302 includes a plurality of keywords 303-309 extracted from the statement 301. The results section 302 also reflects relevance scores 312 and sentiment 313 (e.g., positive, negative, or neutral) for a subset of keywords 311.

FIG. 3B illustrates a GUI 350 depicting results of analyzing text for conversion to a gamification system, according to one embodiment. In at least one embodiment, the GUI is generated based on the analysis of the text analyzer 102. As shown, the GUI 350 includes an example goal statement 351 which requires a user to "collaborate with technology partner to build a system." The GUI 350 includes a results section 352 reflecting the relationships between words in the statement 351 identified by the text analyzer 102. As shown, the results section 352 includes parts of speech 353, verb nominalizations 358, and relational entities 364. The parts of speech 353 reflect, for a text 354 portion of the statement 351, a part of speech 355 (e.g., subject, action, object, etc.), a sentiment 356, and keywords 357. The verb nominalization 358 reflects, for a text portion 359 of the statement 351, a lemmatized version 360 of the text 359, a verb format 361 of the text, a tense 362 of the text 351, and whether the text 351 is negated 363. The relational entities 364 specify a part of speech 366, a type 367, subtypes 368, and linked data 369 for an entity 365 extracted from the text 351.

Generally, the GUIs 300, 350 reflect results of the text analysis 102 and/or classifiers 104, 105. Based on the respective analyses, goal statements can be converted into missions, PIs, and actions, and stored in the game data 310. For example, in FIG. 3A, the text analyzer 102 may identify the numerical keyword of "40 hours," which is classified as a PI. Similarly, FIG. 3A displays multiple keywords (or concepts), such as "cloud computing," "technical skills," and "leadership." As such, the text analyzer 102 may group the concepts in the statement 301 into a single gamification mission, namely 40 hours of technical skill advancement in cloud computing and leadership. These missions, PIs, and actions may then be outputted to the user via the GUIs 300, 350, for feedback. The user may provide feedback indicating whether the missions, PIs, and actions are properly classified.

Figure 4:
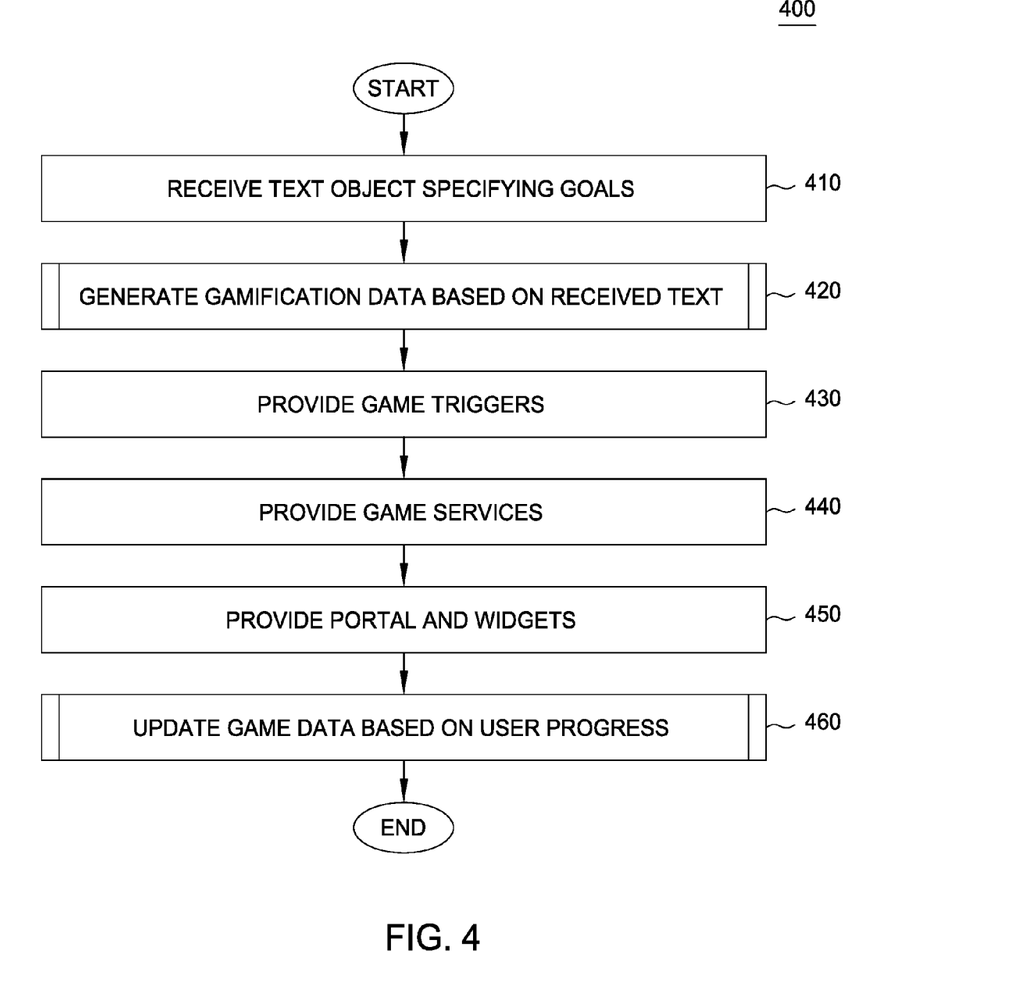
FIG. 4 is a flow chart illustrating an example method to convert text-based goals to a gamification system, according to one embodiment.

FIG. 4 is a flow chart illustrating an example method 400 to convert text-based goals to a gamification system, according to one embodiment. As shown, the method 400 begins at block 410, where the text analyzer 102 receives one or more text objects specifying goals. At block 420, the text analyzer 102, the classifiers 104, 105, and the game deployer 103 may generate gamification data based on the text received at block 420. The gamification data may include indications of missions, PIs, and actions extracted from the text. At block 430, the game deployer 103 may provide the game triggers 109 for the gamification data generated at block 420. The game triggers 109 generally include database triggers that facilitate updating the game contents 110 (including the history table 112 stored therein).

At block 440, the game deployer 103 may provide the game services 108 for the gamification data generated at block 420. The game services 108 generally include services that facilitate operation the gamification system that includes the gamification data generated at block 420. At block 450, the game deployer 103 may provide the information portal and widgets 107. Doing so allows users to interact with the gamification system, enhance user interaction, and motivate users to achieve their goals. At block 460, the game data services 108 may update the game contents 110 based on user progress. For example, if a user is required to attend 25 hours of educational training (a PI equal to 25), the user may periodically update their profile to reflect attendance of ten 2.5 hour courses. Each time the user updates their profile, the game triggers 109 may invoke the game data services 108 to update the value associated with the PI. The game triggers 109 may update the history table 112 to reflect each update (e.g., 10 updates reflecting each 2.5 hour course). As the user completes goals, actions, and missions, the game data services 108 and game triggers 109 may modify the game contents 110 accordingly.

Figure 5:
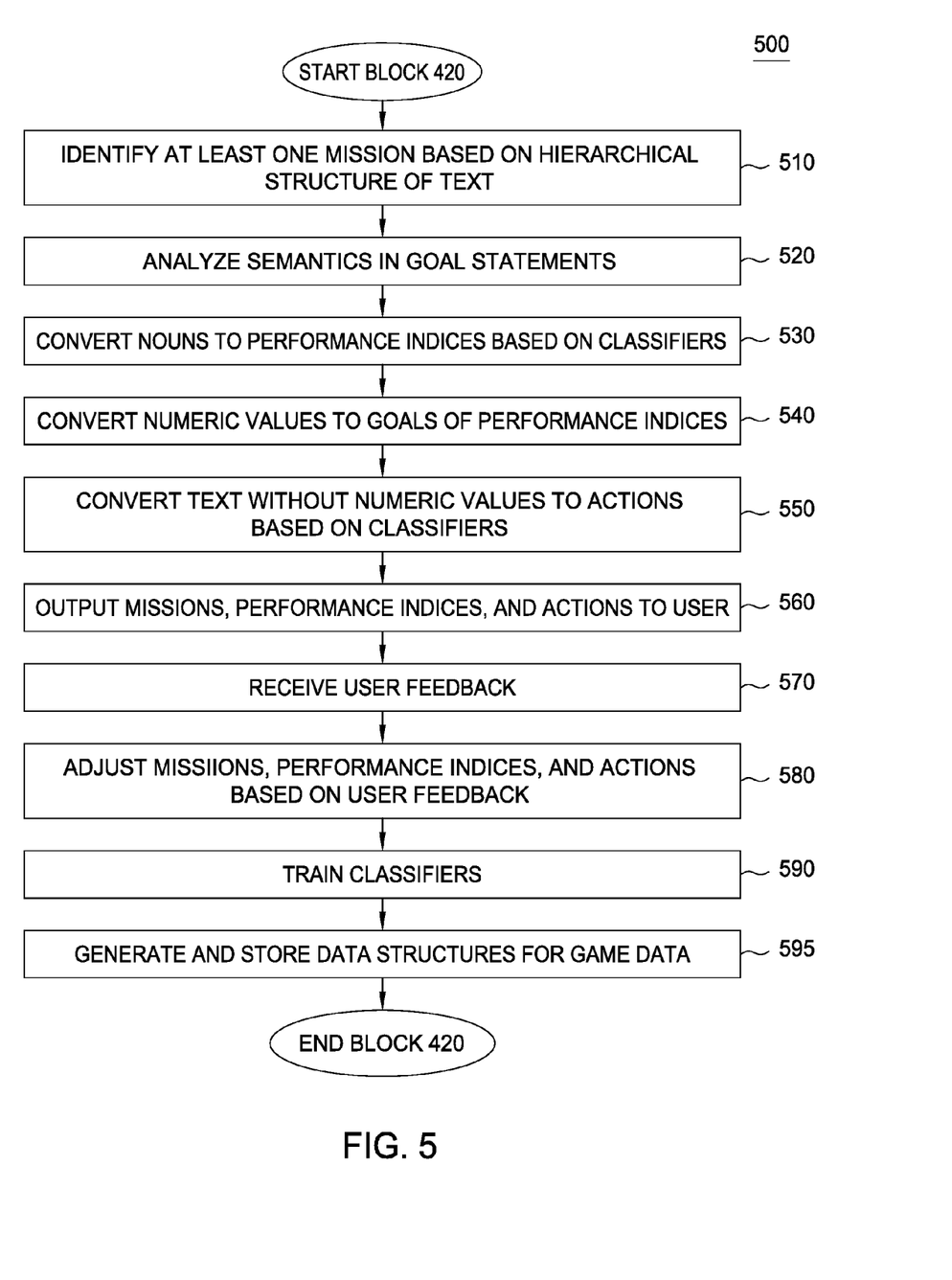
FIG. 5 is a flow chart illustrating an example method to generate game data based on text, according to one embodiment.

FIG. 5 is a flow chart illustrating an example method 500 corresponding to block 420 to generate game data based on text, according to one embodiment. As shown, the method begins at block 510, where the text analyzer 102 identifies at least one mission based on the hierarchical structure of the text object storing the goal statement text. For example, the text analyzer 102 may identify indentation (as in the text object 111) or other formatting that indicates a mission (e.g., the statement 112) has multiple components (e.g., the statements 113-115). At block 520, the text analyzer 102 may analyze the semantics of the goal statements to identify the meaning of each keyword (or concept) in the goal statement text. At block 530, the PI classifier 104 may convert nouns to PIs based on the training data and data models stored in the classifier database 106. At block 540, the PI classifier 104 converts numeric values in goal statements to the goals of the PIs. For example, the PI classifier 104 may convert the "30" in statement 113 to a quantifiable goal of the PI statement 113, namely to file 30 patent disclosures rated file.

At block 550, the action classifier 105 may convert text without numeric values to actions based on the training data and data models stored in the classifier database 106. For example, the classifier database 106 may include a plurality of different action types. The action classifier 105 may classify a portion of text (without numeric values) to be one of the plurality of different action types. In one embodiment, the action classifier 105 may compute a plurality of scores for the portion of text, where each score reflects a likelihood that the portion of text is correctly classified as belonging to a respective one of the plurality of actions. At block 560, the text analyzer 102 may output the missions, PIs, and actions generated at blocks 530-550 to a user for review. At block 570, the text analyzer 102 may receive user feedback. The feedback may, for example, mark the missions, PIs, and actions, as correct, incorrect, and the like. The feedback may further modify the missions, PIs, and actions (such as changing 30 patent disclosures rated search to 35 patent disclosures rated search). At block 580, the text analyzer 102 may adjust the missions, PIs, and actions based on the user feedback received at block 570. At block 590, the text analyzer 102 may train the classifiers 104, 105 based on the feedback (e.g., whether the classifiers 104, 105 properly classified the text in the text objects 101). Doing so allows the classifiers 104, 105 to improve their classification accuracy in future iterations. At block 595, the game deployer 103 may generate the data structures (e.g., PIs, missions, and actions), and store the generated data in the game contents 110.

Figure 6:
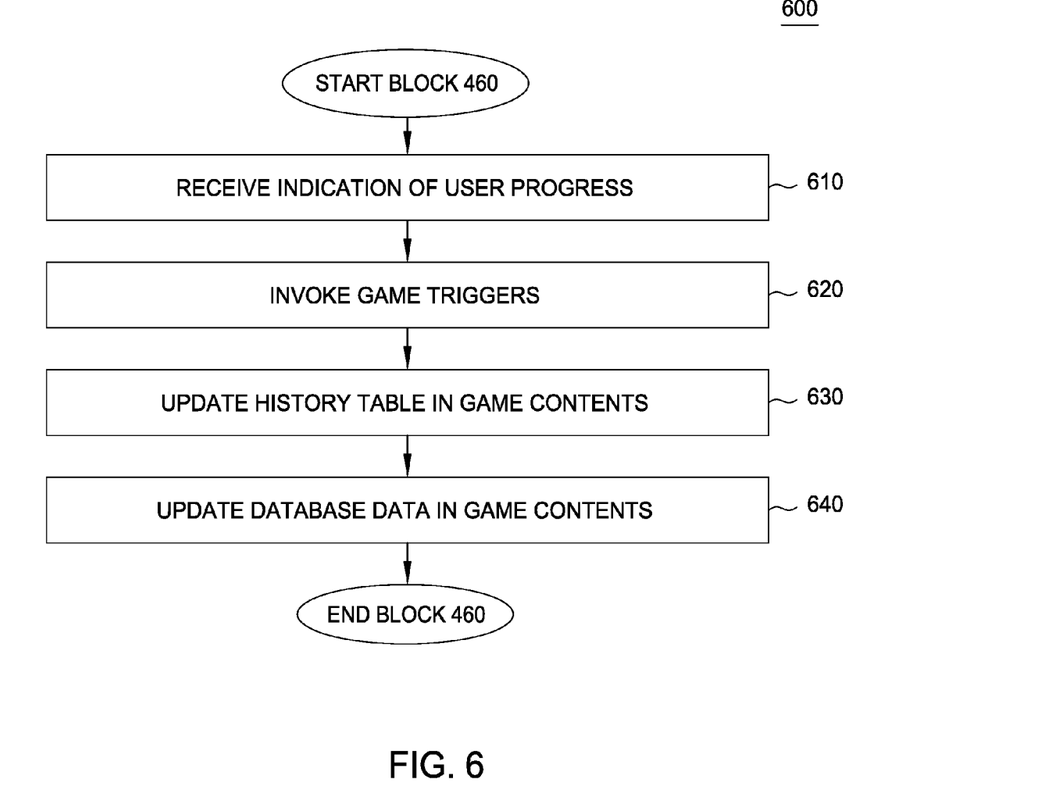
FIG. 6 is a flow chart illustrating an example method to update game data based on user progress, according to one embodiment.

FIG. 6 is a flow chart illustrating an example method 600 corresponding to block 460 to update game data based on user progress, according to one embodiment. As shown, the method 600 begins at block 610, where the game data services 108 receive an indication of user progress towards fulfilling one or more of a mission, PI, or action. For example, a user may submit an update of their progress towards a PI of completing 10 hours of continuing education by adding an indication of a 1 hour course via the information portal and/or widgets 107. As another example, the game data services 108 may automatically receive an external indication of the user's progress. For example, a corporate security platform may store an indication that a user's password was compromised, and security measures were invoked as a result. The game data services 108 may receive an indication of the events from the security platform, and trigger a flow to reflect that the user did not comply with security policies per the goal statement 115.

At block 620, the game data services 108 may invoke one or more game triggers 109 to update the game contents 110 based on the received indication of user progress. At block 630, the game triggers 109 may update the history table 112 to reflect the received indication of user progress. For example, the history table 112 may be updated to reflect the user submission of the completed hour of continuing education. Similarly, the history table 112 may be updated to reflect the compromised password and violation of corporate security policies. The history table 112 may be updated to include an indication of the type of event (e.g., incrementing or decrementing a PI, completion of an action, etc.), a timestamp when the event occurred, and a user associated with the event. At block 640, the game triggers 109 may update the game contents 110 to reflect the user's progress. For example, if the user had completed two hours of continuing education, the game triggers 109 may add the additional hour of completed continuing education to the game contents 110, bringing the total to three hours. Similarly, the game triggers 109 may update the game contents 110 to reflect that the user did not comply with security policies subsequent to the compromise of the user's password.

Figure 7:
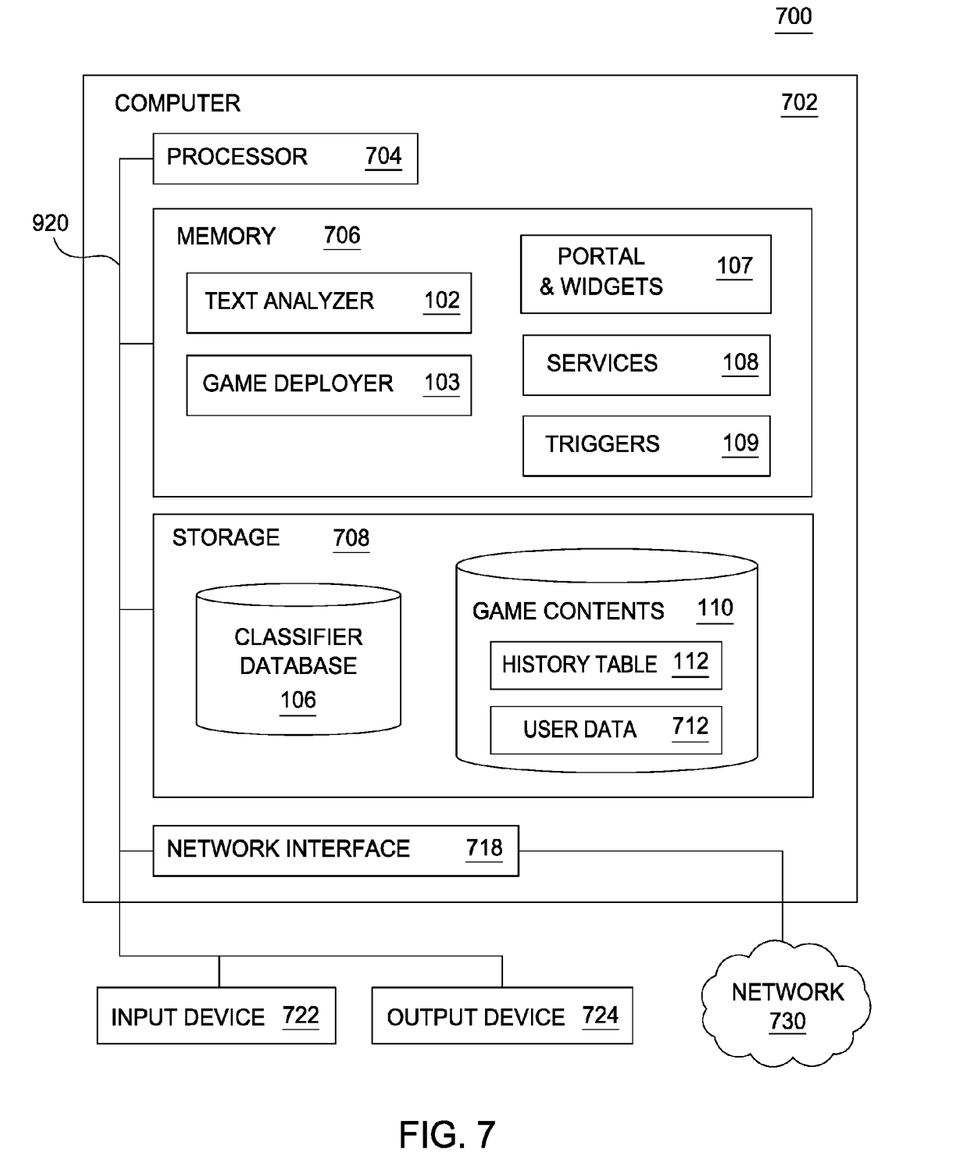
FIG. 7 illustrates an example gamification system which converts text-based goals, according to one embodiment.

FIG. 7 illustrates an example gamification system 700 which converts text based goals, according to one embodiment. The networked system 700 includes a computer 702. The computer 702 may also be connected to other computers via a network 730. In general, the network 730 may be a telecommunications network and/or a wide area network (WAN). In a particular embodiment, the network 730 is the Internet.

The computer 702 generally includes a processor 704 which obtains instructions and data via a bus 720 from a memory 706 and/or a storage 708. The computer 702 may also include one or more network interface devices 718, input devices 722, and output devices 724 connected to the bus 720. The computer 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 702 to communicate with other computers via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the computer 702 via the bus 720.

The input device 722 may be any device for providing input to the computer 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 702. The output device 724 may include output devices such as monitors, touch screen displays, and so on.

As shown, the memory 706 contains the text analyzer 102, the game deployer 103, the information portal and widgets 107, game data services 108, and game triggers 109, all described in greater detail above. The text analyzer 102 may include the PI classifier 104 (not pictured for clarity) and action classifier 105 (also not pictured for clarity). Generally, the system 700 is configured to implement all apparatuses, systems, methods, and functionality described above with reference to FIGS. 1-6.

As shown, the storage 708 contains the classifier database 106 and game contents 110, described in greater detail above. As shown, the game contents 110 includes the history table 112 and a user data 712. The user data 712 is configured to store information for a plurality of different user of the gamification system 700. For example, the user data 712 may store user metadata (including biographical information) as well as records used to reflect the user's progress towards completion of missions, PIs, and actions.

Advantageously, embodiments disclosed herein automatically create a gamification system based on textual goals specified in text objects. Doing so removes the need for users to deal with game design and development for the gamification system, and provides users with instant visibility of their achievements and the achievements of others. Furthermore, the technical field of gamification systems is improved by providing a gamification system that automatically identifies missions, PIs, and actions in a text-based object. The gamification system can automatically be configured based on the identified missions, PIs, and actions, by providing the necessary data objects, services, portals, widgets, and triggers without the need for user customization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the text analyzer 102 could execute on a computing system in the cloud. In such a case, the user text analyzer 102 may store mission data, PI data, and action data in the game contents 110 for a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a text object comprising a plurality of text statements;
inputting the text object into a text analyzer executing on a processor, the text analyzer configured to analyze the plurality of text statements in the text object based at least in part on a structure of the plurality of text statements in the text object;
classifying a first statement of the plurality of text statements as including a performance index, wherein the performance index comprises a required value that must be fulfilled by a user;
classifying a second statement of the plurality of text statements as including an action;
defining, based on the analyzing and classifying, a mission comprising the performance index and the action;
deploying, in a gamification system, the mission and a plurality of backend computing resources for the mission;
receiving an indication that the user has completed the action;
updating a history table to reflect that the user has completed the action; and
updating a user profile of the user to reflect that the user has completed the action.

2. The method of claim 1, further comprising:
receiving an indication that the user has completed a first portion of the performance index;
updating the history table to reflect that the user has completed the first portion of the performance index;
updating a current value for the performance index in the user profile based on the first portion of the performance index; and
upon determining that the updated current value is at least one of greater than and equal to the required value, storing an indication that the user has completed the mission.

3. The method of claim 1, wherein classifying the first statement comprises:
responsive to identifying a noun in the first statement:
classifying the noun as the performance index based on a first classifier, of a plurality of classifiers; and
converting a numeric value in the first statement to a required value for the performance index; and
upon determining that the first statement does not include numeric values, classifying the first statement as the action.

4. The method of claim 1, wherein the plurality of backend resources comprise:
a data store configured to store respective indications of progress for each of a plurality of users towards completing the mission;
a plurality of data services;
an information portal configured to provide a graphical user interface outputting a current status of the user in the gamification system;
a plurality of widgets;
a plurality of database triggers; and
a history table configured to track updates to the data store.

5. A computer program product, comprising:
a computer-readable storage medium having computer readable program code embodied therewith, the computer readable program code executable by a processor to perform an operation comprising:
receiving a text object comprising a plurality of text statements;
inputting the text object into a text analyzer executing on the processor, the text analyzer configured to analyze the plurality of text statements in the text object based at least in part on a structure of the plurality of text statements in the text object;
classifying a first statement of the plurality of text statements as including a performance index, wherein the performance index comprises a required value that must be fulfilled by a user;
classifying a second statement of the plurality of text statements as including an action;
defining, based on the analyzing and classifying, a mission comprising the performance index and the action;
deploying, in a gamification system, the mission and a plurality of backend computing resources for the mission;
receiving an indication that the user has completed the action;
updating a history table to reflect that the user has completed the action; and
updating a user profile of the user to reflect that the user has completed the action.

6. The computer program product of claim 5, the operation further comprising:
receiving an indication that the user has completed a first portion of the performance index;
updating the history table to reflect that the user has completed the first portion of the performance index;
updating a current value for the performance index in the user profile based on the first portion of the performance index; and
upon determining that the updated current value is at least one of greater than and equal to the required value, storing an indication that the user has completed the mission.

7. The computer program product of claim 5, wherein classifying the first statement comprises:
responsive to identifying a noun in the first statement:
classifying the noun as the performance index based on a first classifier, of a plurality of classifiers; and
converting a numeric value in the first statement to a required value for the performance index; and
upon determining that the first statement does not include numeric values, classifying the first statement as the action.

8. The computer program product of claim 5, wherein the plurality of backend resources comprise:
  a data store configured to store respective indications of progress for each of a plurality of users towards completing the mission;
  a plurality of data services;
  an information portal configured to provide a graphical user interface outputting a current status of the user in the gamification system;
  a plurality of widgets;
  a plurality of database triggers; and
  a history table configured to track updates to the data store.

9. A gamification system, comprising:
  a processor; and
  a memory storing one or more instructions which, when executed by the processor, performs an operation comprising:
    receiving a text object comprising a plurality of text statements;
    inputting the text object into a text analyzer executing on the processor, the text analyzer configured to analyze the plurality of text statements in the text object based at least in part on a structure of the plurality of text statements in the text object;
    classifying a first statement of the plurality of text statements as including a performance index, wherein the performance index comprises a required value that must be fulfilled by a user;
    classifying a second statement of the plurality of text statements as including an action;
    defining, based on the analyzing and classifying, a mission comprising the performance index and the action;
    deploying, in the gamification system, the mission and a plurality of backend computing resources for the mission;
    receiving an indication that the user has completed the action;
    updating a history table to reflect that the user has completed the action; and
    updating a user profile of the user to reflect that the user has completed the action.

10. The gamification system of claim 9, the operation further comprising:
  receiving an indication that the user has completed a first portion of the performance index;
  updating the history table to reflect that the user has completed the first portion of the performance index;
  updating a current value for the performance index in the user profile based on the first portion of the performance index; and
  upon determining that the updated current value is at least one of greater than and equal to the required value, storing an indication that the user has completed the mission.

11. The gamification system of claim 9, wherein classifying the first statement comprises:
  responsive to identifying a noun in the first statement:
    classifying the noun as the performance index based on a first classifier, of a plurality of classifiers; and
    converting a numeric value in the first statement to a required value for the performance index; and
    upon determining that the first statement does not include numeric values, classifying the first statement as the action.

12. The gamification system of claim 9, wherein the plurality of backend resources comprise:
  a data store configured to store respective indications of progress for each of a plurality of users towards completing the mission;
  a plurality of data services;
  an information portal configured to provide a graphical user interface outputting a current status of the user in the gamification system;
  a plurality of widgets;
  a plurality of database triggers; and
  a history table configured to track updates to the data store.

* * * * *